Patented Mar. 16, 1926.

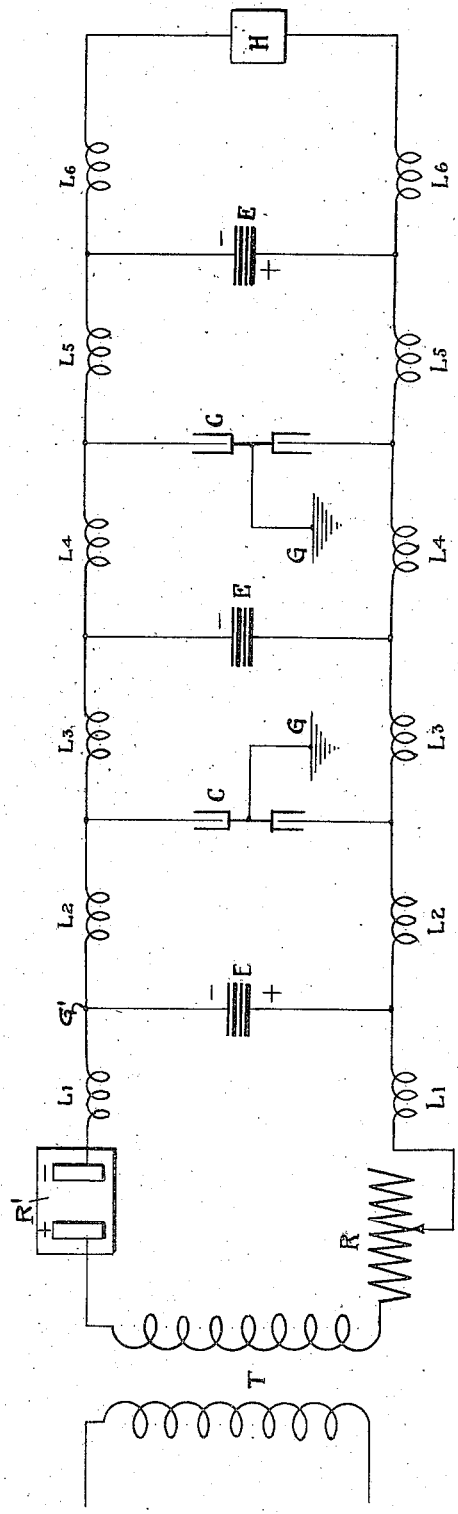

1,577,248

UNITED STATES PATENT OFFICE.

SAMUEL COHEN, OF BROOKLYN, NEW YORK.

METHOD OF AND APPARATUS FOR DERIVING A CONSTANT CURRENT.

Application filed April 18, 1924. Serial No. 707,372.

*To all whom it may concern:*

Be it known that I, SAMUEL COHEN, a citizen of the United States, residing at Brooklyn, in the county of Kings, city and State of New York, have invented certain new and useful Improvements in Methods of and Apparatus for Deriving a Constant Current, of which the following is a specification.

This invention relates to a new and improved method of and apparatus for deriving a constant current from a source of pulsating or alternating current.

One of the objects of my invention is to provide a simple and efficient method of so deriving a constant current with either no variation at all or with a variation which is so negligible that the said current can be used in radio receiving circuits to serve as a substitute for the current at present derived either from the "A" battery or from the "B" battery.

Another object of my invention is to provide a method and means of the kind above described which will obviate the necessity of using filters and all complicated and expensive apparatus.

Another object of my invention is to provide an apparatus and a device of the kind above specified which will give a uniform and efficient action at all times.

Other objects of my invention will be set forth in the following description and in the drawing which diagrammatically illustrates a preferred embodiment of my invention.

A source of alternating or pulsating current is connected to the terminals of the primary transformer T which can be of any ordinary type.

The secondary coil of the transformer T is connected to the load H by means of a rectifier R', a regulating resistance R, and by means of a plurality of sections each of which is designed to receive and transmit the desired current pulse and to also receive and suppress or by-pass any undesirable current pulse so that by the use of a sufficient number of sections the load H receives only a substantially uniform direct current.

The current pulses formed in the secondary of the transformer T are first passed through a rectifier R'. This rectifier R' can be of any desired type and it may be either electrolytic or electronic in its action. The action of the rectifier is to interpose much greater resistance to one pulse of the current than to the other pulse thereof and this is indicated in the diagrammatic drawing to show that normally the upper wire of the receiving line is negative in value. However, no rectifier has as yet been made which completely suppresses one or more of the pulses of the alternating current formed in the secondary coil of the transformer and it is therefore necessary, to secure the results before mentioned, to suppress the undesired current pulse or pulses after they have passed through the rectifier. The current component which is to be utilized for the load H may for convenience be called the "load" component and the other components may be called the "non-load" components. The load component is either non-pulsating or it has a much lower frequency than the non-load components. The receiving lines or mains have a series of inductances $L_1$, $L_2$, $L_3$, $L_4$, $L_5$, and $L_6$ which are symmetrically arranged. These inductances are preferably of equal value and are preferably made with low resistance by providing iron cores for a coil having relatively few windings and a relatively small length. A series of electrolytic condensers are interposed between the two halves of the receiving line, each electrolytic condenser being connected to a pair of the inductances above mentioned. These electrolytic condensers each consist of a pair of lead electrodes immersed in a sulphuric acid solution or steel nickel electrodes immersed in the well known alkaline solution. Each electrolytic condenser E may be formed of any desired number of such cells since the number of such cells present in each condenser E depends upon the voltage desired for the load H.

If a higher voltage is required for the load then a greater number of cells for each condenser E is required.

The action of the said electrolytic condensers E is to accumulate the load current component sent to them through the preceding inductance and to transmit the accumulated charge to the succeeding pair of inductances.

In order to suppress any undesired current pulse, electrostatic condensers C are shunted across the line between the inductance sections so that the electrolytic condensers and the electrostatic condensers alternate. These condensers C should be made strong enough to resist any applied voltage and each condenser C is grounded as shown, the grounded connection being made to the common junction.

Since the impedance of each electrostatic condenser C is infinite for a direct current and since said impedance decreases with the frequency of any alternating current supplied thereto, it is obvious that each condenser C forms a by-pass or shunt whereby any high frequency alternating current in the receiving line is shunted and caused to leak out of the line while the load component of the current in the receiving line is sent on to the next section.

The respective electrolytic condensers E each preferably have the same number of cells and they are arranged so as to have the same relative polarity as shown in the drawing.

If desired, the point G' of the circuit may be grounded and it is then unnecessary to ground the electrostatic condensers C as shown in the drawing.

The load voltage may be controlled by regulating the line current by means of the resistance or rheostat R. The rheostat R can also be utilized for regulating the uniformity of the load voltage and this is accomplished by regulating the charging current to the condensers E.

The number of the series of sections shown in the diagram could be decreased to a single section or to as many sections as may be desired as this depends upon the load, upon the rate of the charging current and the capacity of the electrolytic condensers.

Similarly, the load voltage can be varied for any condition by merely increasing the charging voltage and the number of electrolytic condenser cells per branch.

It is obvious that a combination circuit for providing both a high voltage and a low voltage can be arranged and operated from the same transformer by properly arranging a pair of circuits, each of which could have its own rectifier suitable for the voltage desired and the proper number of electrolytic cells for each electrolytic condenser E. This arrangement makes it possible to supply two constant currents of different voltages.

It is desirable to charge the electrolytic condensers at a slightly greater rate than the discharge which takes place at the load H. I believe that the system will fail to function properly if the rate of discharge is greater than the charging rate. If the charging rate is considerably greater than the discharge rate at the load H, the system becomes unstable and may cause disturbances at the load H.

The value of the inductances $L_1$, $L_2$, $L_3$, $L_4$, $L_5$, and $L_6$ depends upon the frequency of the current supplied to the transformer. In all cases I prefer that there should be an inductance on both branches of the line prior to entering the apparatus at the load H.

While I do not wish to limit myself to any specific theory of operation, the correct theory of operation of the above mentioned apparatus is considered to be as follows:

The current sent through the rectifier R' to the receiving line, while it is a pulsating current, consists of a series of components, namely, the load component and the non-load components. One of these components is a direct current or a pulsating current of relatively low frequency which it is desired to transmit to the load H, and the other components, which are to be suppressed, are alternating or pulsating currents of various frequencies which are higher than the frequency of the load current. These high frequency pulsating or alternating currents have been heretofore suppressed by the use of filters so that an apparatus which accomplished the purposes herein desired was necessarily expensive and bulky.

However, according to my invention the load component passes readily through the low resistance of the inductances to the load H while the alternating currents are shunted to the condensers C. Since the condensers C are grounded at the points G there will be a capacity current to the ground from each condenser C, for each pulsation of the charging current. If the load current is pulsating it charges the condensers E, which have greater capacities than the condensers C, so that the action of condensers E and the inductances changes the pulsating load component or current to direct current.

Thus, it has been found that when each of the coils $L_1$, $L_2$, etc., has an inductance of two henries, that each of the condensers E should have a capacity of 20 microfarads and each of the condensers C should have a capacity of one (1) microfarad.

Hence, by having a sufficient number of sections the undesirable high frequency pulsating components of the current transmitted through the rectifier R' are dissipated by means of the high impedance and the leakage currents so that the load H receives substantially only a direct current.

The reason for the use of the electrolytic condensers E is because they are of large capacity but said condensers E could be replaced by electrostatic condensers of sufficiently large capacity without departing from my invention.

Similarly, I can increase the load component of the current transmitted through the rectifier R' by having the various inductances provided with air cores and providing each inductance with sufficient turns to supply the necessary impedance. The increase in the resistance thus produced can be taken care of by simply increasing the voltage supplied by the secondary winding.

I have described a preferred embodiment of my invention but it is clear that numerous changes and omissions could be made without departing from its spirit, and I believe and claim that my invention is pioneer in separating pulsating current components from a complex current, by causing the said pulsating components to leak out of the line.

I claim:

1. A circuit including a plurality of mains, a load connected to one end of said mains, a source of current connected to the other end of said mains and adapted to deliver a complex current having a load component and a non-load component of higher frequency than said load component, impedance means connected in series with said mains, relatively large capacity means connected in shunt with said mains and between sets of said impedance means, relatively small capacity means connected in shunt with said mains between other sets of said impedance means, and connections leading from a midpoint in each of said relatively small capacity means to ground.

2. A circuit for eliminating undesired electrical pulsations comprising in combination with a source of pulsating current, a pair of lines, inductances connected in series in each of said lines and a plurality of branch circuits connected in shunt with said lines across points between said inductances, alternate ones of said branch circuits including high capacity devices and adjacent ones of said branch circuits including a pair of small capacities having the midpoints thereof connected to ground.

3. A circuit for eliminating undesired electrical pulsations comprising in combination with a source of pulsating current, a pair of lines, inductances connected in series in each of said lines and a plurality of branch circuits connected in shunt with said lines across points between said inductances, an electrolytic condenser connected in alternate branch circuits, a pair of relatively small capacities disposed in alternate branch circuits adjacent each of the branch circuits including said electrolytic condensers, and connections from points intermediate said small capacities to ground.

In testimony whereof I hereunto affix my signature.

SAMUEL COHEN.